Sept. 20, 1966     H. F. GARDNER ETAL     3,273,168
ADJUSTABLE ALIGNMENT COUPLING FOR LOWER EXTREMITY PROSTHESES
Filed June 21, 1963     2 Sheets-Sheet 1
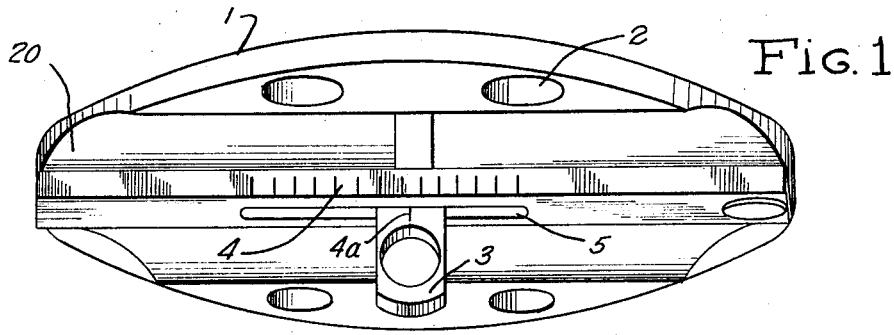
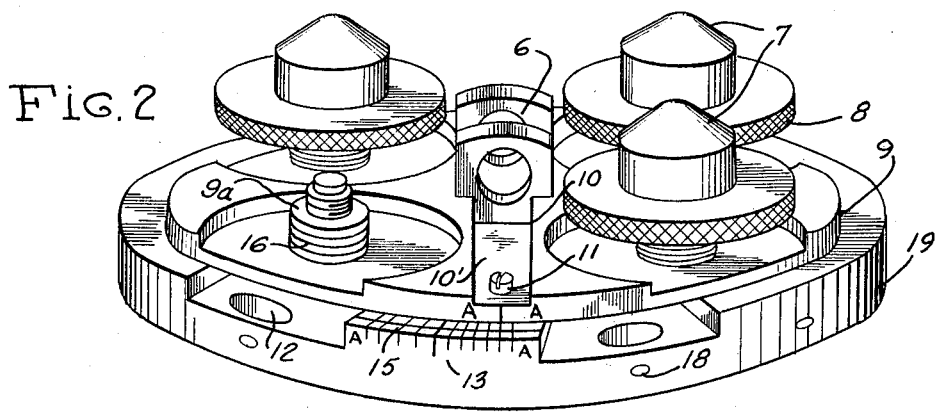
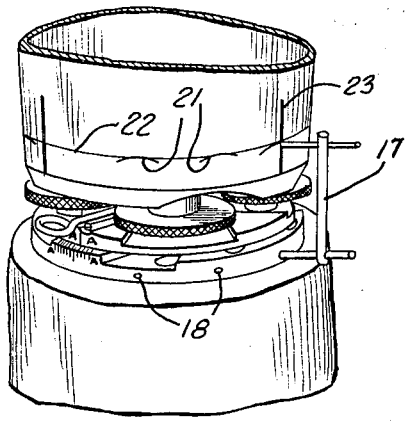
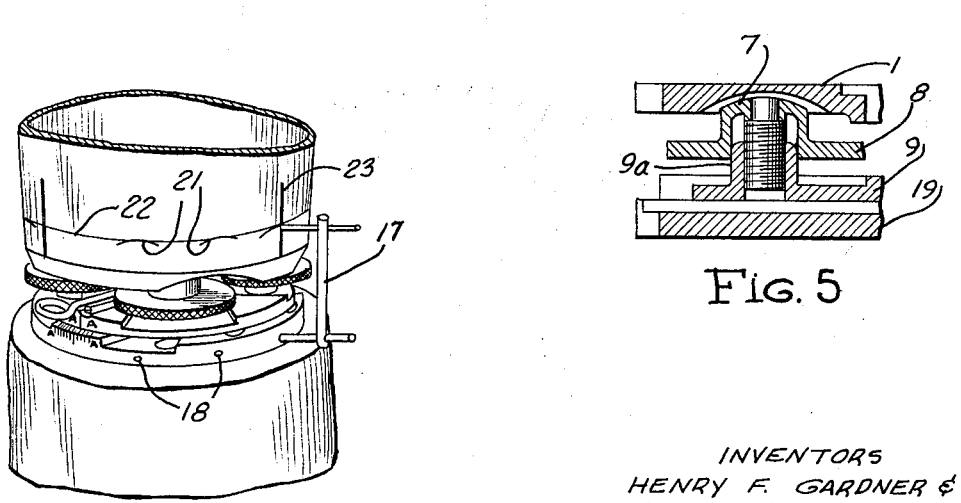
INVENTORS
HENRY F. GARDNER &
ANTHONY STAROS
BY
ATTORNEY

INVENTORS
HENRY F. GARDNER &
ANTHONY STAROS

BY

ATTORNEY

United States Patent Office 3,273,168
Patented Sept. 20, 1966

3,273,168
ADJUSTABLE ALIGNMENT COUPLING FOR
LOWER EXTREMITY PROSTHESES
Henry F. Gardner, New York, and Anthony Staros,
Northport, N.Y., assignors to the United States of
America as represented by the Secretary of the Army
or the Administrator of Veteran Affairs
Filed June 21, 1963, Ser. No. 289,764
8 Claims. (Cl. 3—1)

The invention described herein may be manufactured and used by or for the Government for governmental purposes, without the payment to us of any royalty thereon.

When there is doubt about the ability of an amputee to use an artificial leg, prescription of a permanent prosthesis may result in costly, unnecessary expenditures. Furthermore, physical changes brought about by the first use of a prosthesis may require costly revisions to the permanent prosthesis.

Temporary prostheses and pylons are fitted for several reasons. An evaluation of an amputee's ability to cope with the problems of using a prosthesis may be obtained through their use. In addition, early ambulation accelerates some conditioning, and training in gait can be initiated sooner than would be the case if a temporary limb were not used. A temporary prosthesis is indicated in these situations because of its immediate availability as well as its simplicity and economy in comparison to a permanent prosthesis.

The temporary prosthesis by design should simulate the functions which will eventually be provided in a permanent prosthesis. One main purpose of temporary prosthesis use is to familiarize the amputee with true prosthetic function so that clinical evaluation and amputee conditioning are realistic. A study of an amputee's physiological reactions to an inadequate prosthetic device would produce erroneous conclusions. Inadequate alignment as well as improper socket shape in the temporary prosthesis, besides confusing any evaluation of the amputee's physical abilities, may cause the development of poor gait habits which will be difficult to overcome in the use of the permanent device.

It is essential that the amputee should not be compelled to adjust to two different types of alignment. Nor should evaluations of an amputee's ability to cope with one kind of device be performed on another and completely different kind.

It is therefore an object of the instant invention to provide new and novel alignment means in a temporary prosthesis which would allow simulation in the temporary prosthesis of all physical, permanent characteristics of the permanent prosthesis while at the same time providing alignment adjustment means: anteroposterior, mediolateral, tilting, and rotational adjustments and alignment.

A second and further object of the instant invention is to provide, in an alignment coupling with the characteristics above described, a simple and inexpensive means, not only of adjusting and aligning the prosthesis, but also, and of the essence, a means of accurately transferring the alignment of the coupling to the permanent prosthesis.

Briefly, the coupling comprises a top plate with a medial laterally adjustable toggle, an intermediate plate mounting a plurality of tilt screws, and a bottom plate with an anterior-posterior adjustable shackle which couples with the medial laterally adjustable toggle of the top plate.

This coupling is normally installed just below the temporary socket. For above-knee prosthesis, the regular components, at the knee, shank and foot can then be assembled, with wood screws, to the coupling and socket The knee and shank need only be roughly formed. Since the positions of the upper and lower segments of the coupling can be adjusted with respect to each other (in rotation, in linear translations, and in tilt), alignment determinations can be made as needed. An advantage to the coupling is that the temporary prosthesis for an above-knee amputee can have the same knee function as will be prescribed for permanent use. Or the clinician, if he desires, can try various knees with various alignments.

Although the coupling does not offer the same advantage in below-knee use, it can be applied for this level of amputee as well. With the coupling, the rough unfinished shank can be used temporarily, as socket and alignment changes are made. Finally, the coupling can be removed with alignment preserved, and the shank can be finished to provide the final prosthesis.

Further objects of this invention will be obvious to those skilled in the art upon examination of the drawings wherein:

FIG. 1 is a bottom perspective view of the top assembly of the coupling;

FIG. 2 is a top perspective view of the bottom assembly of the coupling;

FIG. 5 is a section taken on the line 5—5 of FIG. 3;

FIG. 6 is a perspective view of the coupling assembled as part of the prosthesis showing part of the transfer apparatus and procedure.

Figure 3:
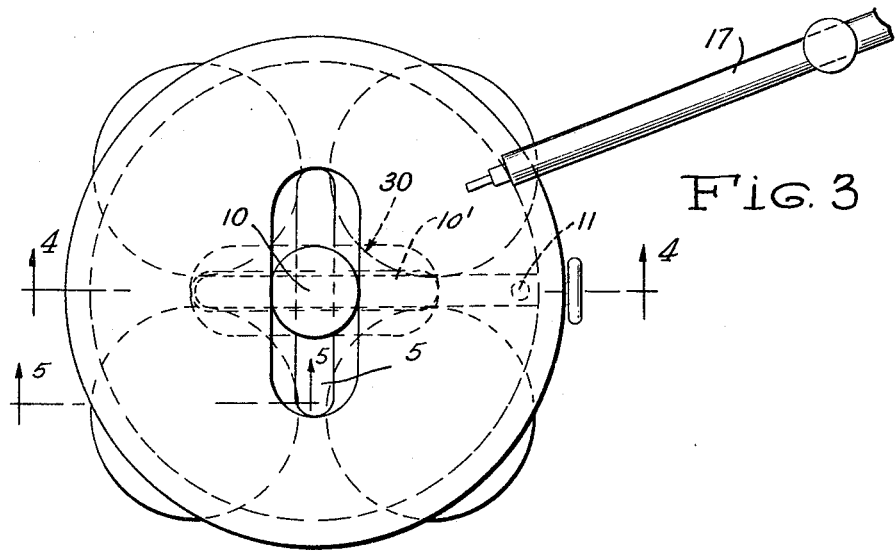
FIG. 3 is a plan view of the entire assembly.
Figure 4:
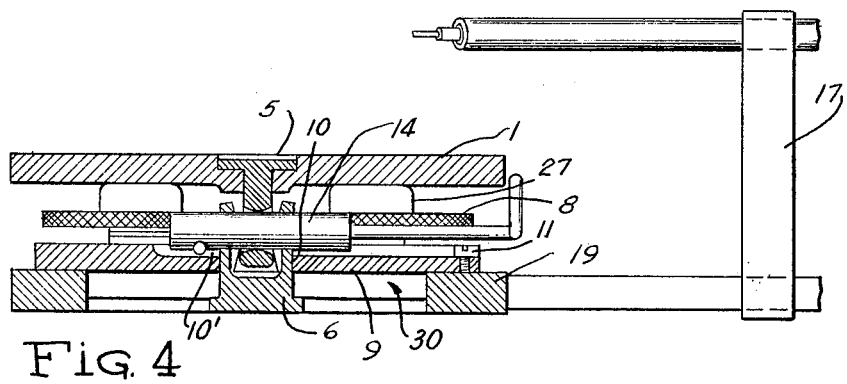
FIG. 4 is a section taken on the line 4—4 of FIG. 3.
Figure 7:
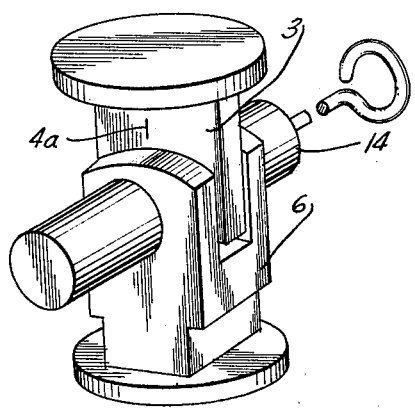
FIG. 7 is a detailed perspective view of the toggle link connection.

Referring in more detail to the preferred embodiment of this invention as represented in FIGS. 1 through 7, toggle link 3 is mounted in slot 5 of top plate 1. Top plate 1 is affixed to the proximal portion of the prosthesis by means of screws fastened through screw holes 2. The bottom assembly (FIG. 2) comprises intermediate plate 9 mounted over bottom plate 19. Slidably and rotatably mounted within bottom plate 19 and projecting upwardly through slot 30 of bottom plate 19 and slot 10 of intermediate plate 9 is clevis 6. When the upper and lower portions of the prosthesis are assembled, link 3 is locked to clevis 6 by means of toggle pin 14. Mounted on intermediate plate 9 in the preferred embodiment of this invention are tilt screws 7 each with rotation disks 8 for finger tip adjustment. Each tilt screw is received in an upstanding portion 9a of intermediate plate 9. The upstanding portion has, on its outer surface a tilt scale 16 which is matched with a tilt index (not shown) on each rotation disk 8. Intermediate plate 9 is not rigidly affixed to bottom plate 19 but rather is slidably and rotatably mounted thereon through the coaction of clevis 6 and slot 30. Clevis 6, in the preferred embodiment, is free to rotate in slot 30 of bottom plate 19 due to the fact that the width of slot 30 is greater than the largest transverse width of the shank portion but less than the diameter of the expanded lower portion of clevis 6. Plate 19 then possesses both sliding and rotational movement about clevis 6. Slot 10 of intermediate plate 9 extends through said plate and has a width equal to the width of the rectangular shank portion of clevis 6. Therefore, intermediate plate 9 will neither rotate nor slide horizontally in relation to clevis 6. Bottom plate 19 is rigidly affixed to the distal portion of the prosthesis by screws through screw holes 12. Compass holes 18 in bottom plate 19 are used with transfer compass 17 as described below in the transfer process. Lower plate 19 is equipped with rotation scale 13 and anterior-posterior scale 15, both of which, in conjunction with tilt scale 16 for the several tilt screws, comprise the entire alignment measurement means. When the coupling is assembled and locked together by toggle pin 14, the tops of tilt screws 7 rest in channels 20 of top plate 1 (see FIG. 5).

In our preferred embodiment, the coupling is 1⅛ inches thick and 3¾ inches in diameter. Its weight is ¾ of a pound. A medial-lateral adjustment of 1¼ inches is provided with calibrations at ⅛ inch increments. Anterior-posterior adjustment is also calibrated in ⅛ inch increments for a full range of 1¾ inches. A 20° range of rotation is calibrated in 2° increments; and a 10° range of tilt is calibrated in 2° increments. Each calibration scale has highlighted embossing for the neutral or midpoint setting.

In order to disassemble the coupling, each tilt screw is lowered two increments on the tilt scale. The toggle pin 14 is pulled out along groove 10' in plate 9 until it engages screw 11, thereby clearing the toggle for separation of the top assembly from the bottom assembly. The top assembly includes the top plate and toggle link 3. The bottom assembly includes intermediate plate 9, bottom plate 19 and clevis 6.

The coupling is installed on the prosthesis by attaching the top plate of the coupling to the bottom of the socket using as many wood screws as possible and with the medial-lateral scale perpendicular to the front of the limb. The coupling is then assembled and set in a neutral position, all adjustment scales at 0. The top and bottom plates should then be parallel and coaxial. The socket with the coupling attached should then be temporarily placed on the setup in order to determine overall height. At this point the amputee should stand on the prosthesis in order that it may be adjusted to his height. The prosthetist must, of course, provide manual support of the so far unassembled components of the limb. Proper height is obtained by sanding the section of the prosthesis below the coupling. The coupling is then positioned upon the lower section and attached thereto with wood screws. With the coupling's adjustments still set in the neutral positions, the desired static alignment should be provided when attaching the coupling to the lower section. In order to attach the bottom plate with screws, it is unnecessary to remove the intermediate plate therefrom. Anterior-posterior and medial-lateral shifting of the intermediate plate will clear the holes for screw attachments.

Anterior-posterior adjustment of the prosthesis is accomplished with the amputee in a seated position. The front two tilt screws are loosened and the distal portion of the prosthesis is moved forwardly or backwardly with respect to the proximal portion. After the adjustment the front screws are again tightened.

Medial-lateral adjustment is also accomplished by loosening the front two tilt screws and adjusting from side to side, the degree of adjustment being readily determined from the index marks 4 and reference mark 4a on toggle link 3.

Tilting of the coupling is accomplished with the amputee in a standing position. On the side to be depressed, one of the two screws is loosened to the desired setting. The diagonally opposite screw is then tightened securely. Then the second screw on the side to be depressed is loosened and the diagonally opposite screw is tightened securely.

Rotation of the coupling may be established or, if necessary, re-established before screws are completely tightened in any of the above adjustments. The rotation scale reading may be recorded before making any adjustment, so that the position of rotation may be readily restored.

As to all four adjustments, it is important to remember that tilt screws 7 with adjustment disks 8 be hand tight before the amputee is permitted to walk.

Alignment transfer is accomplished by means of the compass 17 with which is established a line upon the socket base parallel to the base of the coupling. The compass is inserted into compass holes 18 in the bottom plate of the coupling and reference arcs 21 are inscribed around the socket base (see FIG. 6). Line 22 around the socket base is then drawn connecting the tops of the arcs. This circumferential line will be two inches above the bottom surface of the coupling's bottom plate and parallel thereto. Four vertical reference lines 23 are then drawn 90° apart upon the prosthesis joining the socket and lower section. The coupling is then removed. The prosthesis is cut just below the circumferential line established on the socket base. A disk sander is used to sand carefully up to the circumferential line 22. A two inch high wood or foam block with parallel top and bottom surfaces is then placed between the socket base and the distal component. The prosthesis is then assembled using the vertical reference lines to restore the rotation position. An alignment duplication jig may also be used for the transfer process in such a manner as is familiar to those skilled in the art.

We claim:

1. A prosthesis alignment coupling comprising an upper plate fastenable to an upper portion of a prosthetic limb, an intermediate plate, a lower plate fastenable to a lower portion of a prosthetic limb, means adjustably connecting said upper plate and said intermediate plate to allow relative movement between said upper and intermediate plates in a first lateral direction, means rotatably and adjustably connecting said intermediate plate and said lower plate to allow rotative movement between said intermediate and lower plates about their vertical axes and relative movement between said intermediate and lower plates in a second lateral direction transverse to said first lateral direction, means connected to said intermediate plate for tilting said intermediate and lower plates relative to said upper plate, and transfer compass means removably and rotatably attached to a plate of said coupling to mark the alignment of said coupling on the prosthetic limb.

2. The prosthesis alignment coupling described in claim 1, wherein the means adjustably connecting the upper plate and the intermediate plate comprises a toggle link which is adjustably connected at one end to said upper plate and which extends through a slot formed in said upper plate to a connection at its other end with said intermediate plate.

3. The prosthesis alignment coupling described in claim 2, wherein the means rotatably and adjustably connecting the intermediate plate and the lower plate comprises a clevis which is rotatably connected to said lower plate and which rotatably extends through a first slot formed in said lower plate and further extends through a second slot formed in said intermediate plate, said second slot permitting lateral movement only, to a connection with the upper plate.

4. The prosthesis alignment coupling described in claim 3, wherein the means for tilting the intermediate and lower plates relative to the upper plate comprise a plurality of screws attached to said intermediate plate and adjustable toward and away from said upper plate, the upper ends of said screws being seated in recesses formed in the underside of said upper plate.

5. The prosthesis alignment coupling described in claim 1 wherein said means adjustably connecting said upper and intermediate plates comprises a toggle link having an expanded head portion which extends above a slot in the lower surface of the upper plate and a shank portion which extends through the slot formed in said upper plate to a connection with said intermediate and lower plates, wherein said means rotatably and adjustably connecting said intermediate and lower plates comprises a clevis having an expanded lower portion which extends below a slot formed in said intermediate plate and is rotatably seated within a slot formed in said lower plate and a shank portion which extends through the slot in said intermediate plate, said shank portion terminating at said clevis, and wherein said clevis and said toggle link are connected by a removable lock pin passing through the clevis and link.

6. The prosthesis alignment coupling of claim 1 further comprising a rotation scale for measuring rotation between said lower plate and said intermediate plate.

7. The prosthesis alignment coupling of claim 1, further comprising an anterior-posterior scale for measuring anterior-posterior drift between said lower plate and said intermediate plate.

8. The prosthesis alignment coupling of claim 1 further comprising a medial-lateral scale for measuring relative position between said toggle link and said upper plate.

References Cited by the Examiner

UNITED STATES PATENTS

| D. 142,573 | 10/1945 | Mahler. | |
|---|---|---|---|
| 1,213,114 | 1/1917 | Lawrence | 3—21 |
| 1,302,336 | 4/1919 | Erickson | 3—21 |
| 2,106,398 | 1/1938 | Bartusch | 33—27 |
| 2,859,525 | 11/1958 | Carlson | 33—27 |

OTHER REFERENCES

J. W. Edwards: Artificial Limbs, in Orthopaedic Appliances Atlas, Ann Arbor, Mich., volume 2, 1960, pages 280 and 301.

RICHARD A. GAUDET, *Primary Examiner.*

R. L. FRINKS, *Assistant Examiner.*